July 3, 1934.                S. G. KLEVEN              1,965,346
                    RUNWAY SUPPORT FOR WHEELBARROWS
               Original Filed July 9, 1931    2 Sheets-Sheet 1
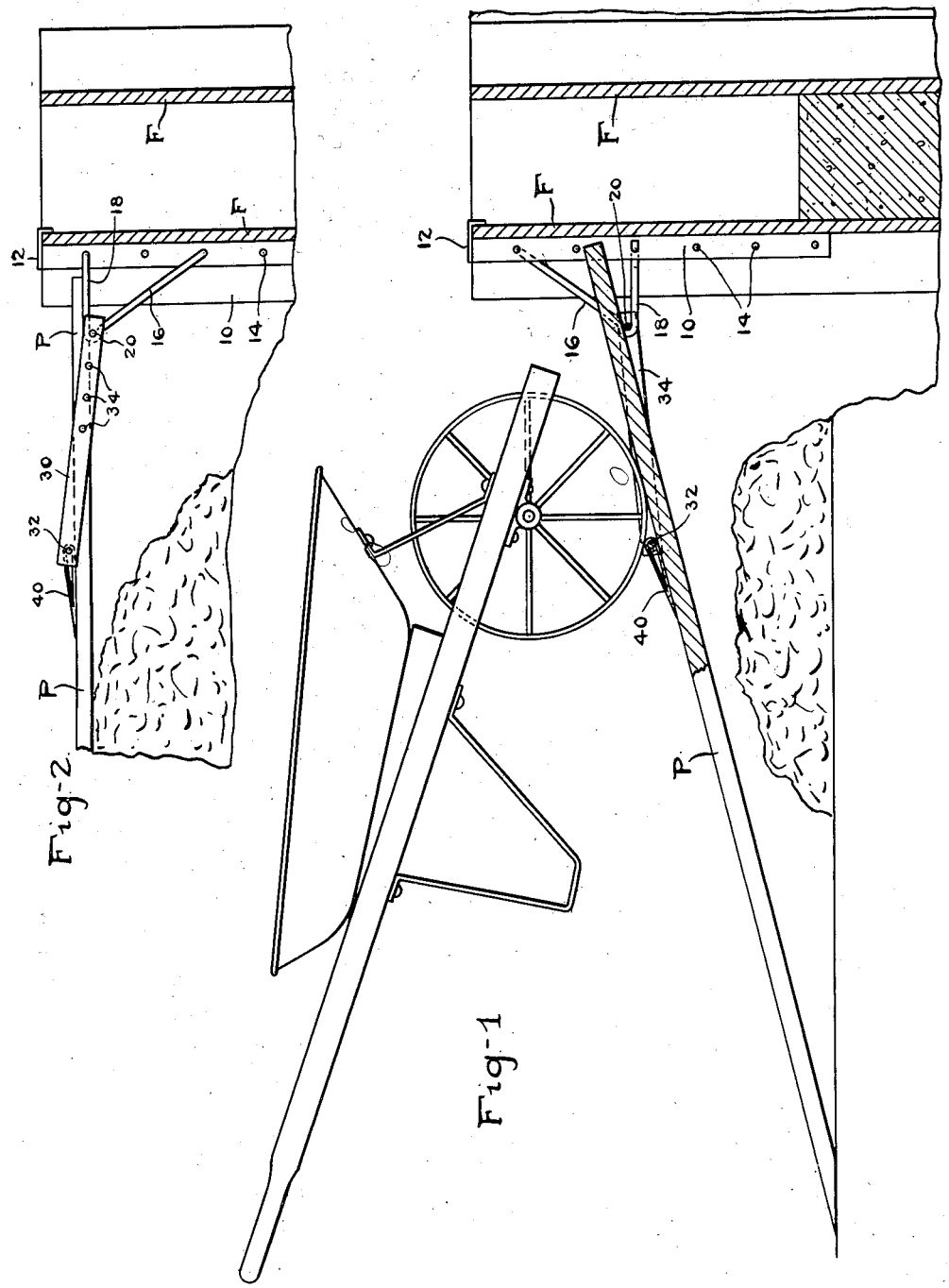
Inventor:
S. G. Kleven.
By Whiteley and Ruckman
Attorneys

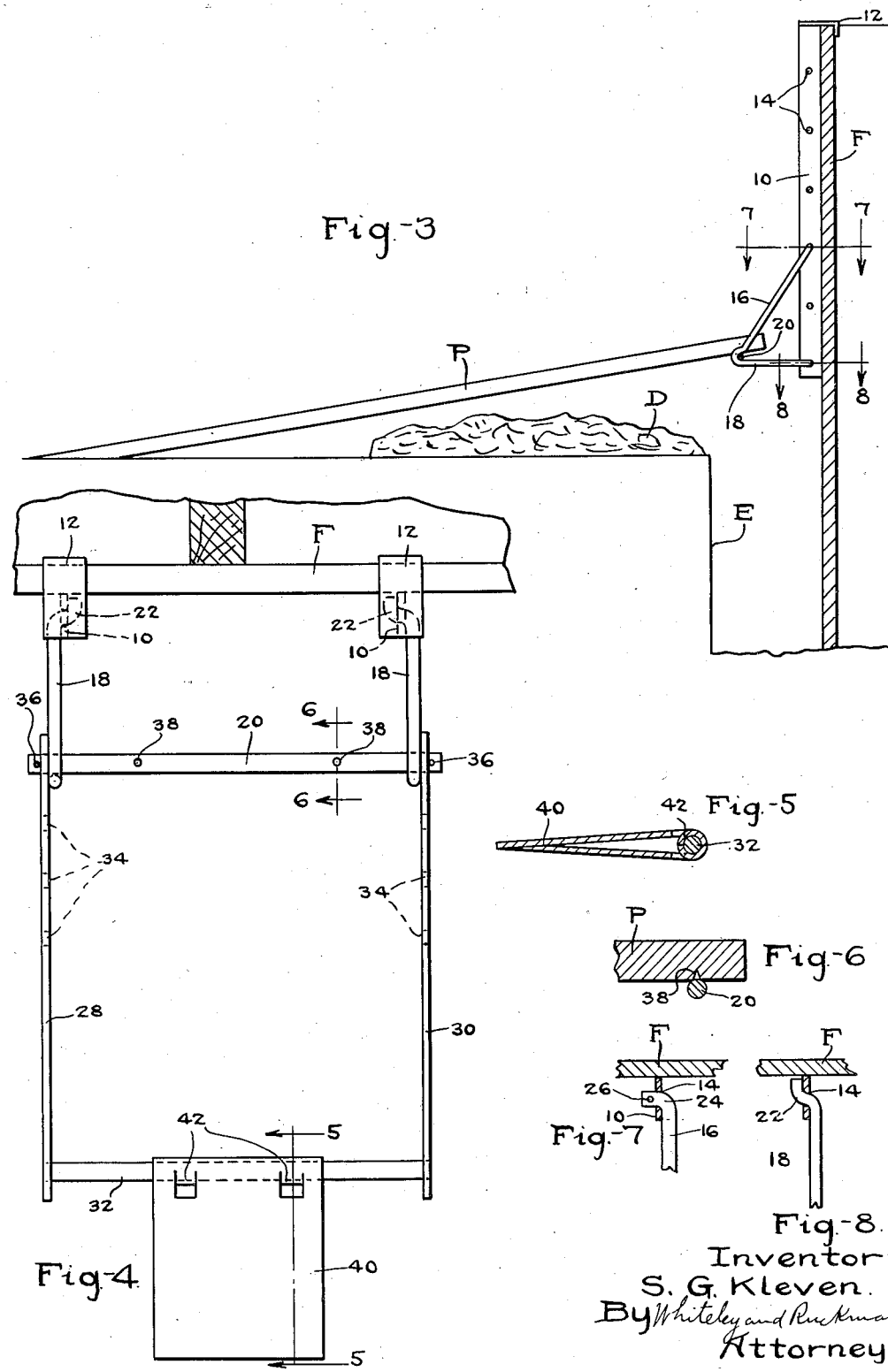

Patented July 3, 1934

1,965,346

UNITED STATES PATENT OFFICE 1,965,346

RUNWAY SUPPORT FOR WHEELBARROWS

Severin G. Kleven, Sisseton, S. Dak.

Application July 9, 1931, Serial No. 549,600
Renewed December 21, 1933

3 Claims. (Cl. 254—88)

My invention relates to runway supports for wheelbarrows, and an object in general is to improve upon the device disclosed in my Patent No. 1,545,262 dated July 7, 1925. A particular object is to provide a device of this character which is adaptable for different conditions which are encountered when dumping concrete from wheelbarrows into forms used in constructing foundations for buildings, such different conditions relating particularly to the ground adjacent the foundation.

The full objects and advantages of my invention will appear in connection with the detailed description thereof, and the novel features of my inventive idea will be particularly pointed out in the claims.

In the accompanying drawings which illustrate a practical embodiment of my invention,—

Fig. 1 is an elevational view showing one manner of using the device. Fig. 2 is a fragmentary view showing another manner of using the device. Fig. 3 is an elevational view showing still another manner of using the device. Fig. 4 is a top plan view of the device. Fig. 5 is a view in section on the line 5—5 of Fig. 4. Fig. 6 is a view in section on the line 6—6 of Fig. 4. Fig. 7 is a view in section on the line 7—7 of Fig. 3. Fig. 8 is a view in section on the line 8—8 of Fig. 3.

As shown in the drawings, the device includes a member having two similar bars 10 which have hooks 12 at the ends thereof which are uppermost when the device is in use. The hooks 12 are adapted to engage over the top of wooden forms F used when concrete is poured. The bars 10 are provided with a number of holes 14 spaced along the length thereof. Two angular shaped members are provided for cooperation with the bars 10. Each of these members in the embodiment shown consists of two rodlike arms 16 and 18 having an angular relationship to each other preferably at about 45° and the arm 16 as shown being somewhat longer than the arm 18. The two angular members are connected by a cross bar 20 secured at the apices thereof preferably by welding and with the ends of the crossbar projecting slightly as shown in Fig. 4. The said members at one end are provided with a double bend 22 adapted to be inserted in one of the holes 14 in a manner which will be readily understood from Fig. 8. The said members at the other end are provided with a simple bend 24 adapted to be inserted in another of the holes 14 and secured therein by a cotter pin 26 as will be understood from Fig. 7. The angular members when thus attached to the bars 10 form a supporting structure which may be placed in the position shown in Figs. 1 and 3 with the arms 16 uppermost or may be placed in the position shown in Figs. 2 and 4 with the arms 18 uppermost. For cooperation with the structure thus far described, a yoke member is provided this yoke member consisting of two arms 28 and 30 connected by a crossbar 32. The arms 28 and 30 are each provided with a series of holes 34 in any corresponding two of which the ends of the crossbar 20 are adapted to be placed by springing the arms outwardly. The parts may be held in this position by cotter pins 36 passed through perforations in the ends of the crossbar 20. The crossbar 20 is provided with outstanding points 38 adapted to bite into the lower surface of a plank P and prevent the latter from sliding. The crossbar 32 has a double plate member 40 attached thereto. This plate member is made from a flat plate by bending it back upon itself at the middle, the free ends being brought close together and the middle being rounded so as to leave a space large enough to receive the crossbar 32. In order to retain the plate member properly in place, lugs 42 are struck inwardly from the material thereof, these lugs being so positioned and bent into curved form as to encircle the crossbar whereby the plate is pivotally attached to the crossbar but cannot slide in a direction at right angles thereto.

The operation and advantages of my invention will be readily understood in connection with the foregoing description. Fig. 1 shows a condition of the ground which very frequently exists adjacent the forms into which the concrete is to be placed. The forms extend up too far to make it possible to dump a wheelbarrow from the ground into the forms unless a considerable amount of grading is first done. The building of scaffolding for the wheelbarrow would be a somewhat expensive and arduous matter. In using my device, the hooks 12 are engaged over one of the walls of the forms F, the ends of the rodlike members 16 and 18 being placed in the holes 14 of the bars 10, so as to bring the crossbar 20 high enough for readily dumping the concrete between the spaced forms F. A plank P is slid underneath the crossbar 32 and over the crossbar 20. The engagement of the points 38 with the plank prevent it from slipping. When the plank is supported in this manner, it serves as a runway for a wheelbarrow loaded with concrete which is to be deposited in the forms. The wheel of the wheelbarrow readily passes up the inclined plate 40 and drops in front of the crossbar 32. This prevents backing up of the wheelbarrow when it is tipped to unload the concrete and, in fact, the crossbar 32 acts as a gauge to position the wheel at the proper distance from the forms so that the concrete will be deposited between them. Due to the fact that the arms 28 and 30 are pivotally attached at their forward ends to the crossbar 20, different inclinations of the plank P are provided for, and due to the fact that the plate 40 is pivotally attached, its lower end will always rest upon the plank. Since the arms 28 and 30 contain a series of holes 34, in which the ends of the crossbar 20 may be placed, it is evident that the crossbar 32 may be readily placed at the proper distance from the forms to serve as a gauge for proper positioning of the wheel of the wheelbarrow while dumping the latter.

Fig. 2 shows the manner in which the device may be used when the earth near the forms is substantially the same height as the top of the forms. In such case, the angularly disposed members 16 and 18 are reversed in position, the double curved end 22 now being placed above, and the outstanding end 24 being placed below. This reversal may be readily made upon removing the cotter pins 26. The crossbar 20 in this arrangement is brought considerably higher than it is in Fig. 1 although the same holes may be used for attaching the ends of the angular members.

Fig. 3 shows the manner in which the device may be used when only an inner wooden form F is used and an earth bank indicated at E is used as the outer form up to the level of the ground. The earth bank is apt to be sandy or loose and liable to cave in if a barrow is wheeled close to the edge, and furthermore, dirt indicated at D is sometimes left as close as possible to the foundation for refilling and grading. In such case, it is therefore desirable to use a supported plank for the wheelbarrow to run on, but since the concrete is dumped directly against the single wooden form, it is not necessary to use the wheel gauge as in the two other conditions previously referred to. Therefore, the arms 28 and 30 are detached from the crossbar 20 which may be readily done by removing the cotterpins 36 and springing the arms outwardly. The hooks 12 are then engaged over the form F and a plank P is supported at its forward end upon the crossbar 20. It will be noted that the crossbar 20 may be supported at the desired height according to which of the holes 14 in the bars 10 are used for securing the ends of the angular shaped members. In the arrangement shown in Fig. 3, the angular members are so located as to bring the crossbar 20 much lower than in Figs. 1 and 2 since as shown in Fig. 3, the concrete instead of being dumped over a wooden frame is dumped against the single wooden form which is employed.

I claim:

1. A runway support for wheelbarrows comprising two bars containing longitudinally spaced holes and having hooks at their upper ends for attachment to forms for concrete, members having two angularly disposed arms, the end of one of said arms having a double bend and the end of the other arm having a simple bend, said ends being adapted for engagement in various ones of said holes, and a crossbar attached at the apices of said arms for supporting the forward end of a plank.

2. A runway support for wheelbarrows comprising two bars containing a plurality of longitudinally spaced holes and having hooks at their upper ends for attachment to forms for concrete, angular-shaped members for cooperation with said bars respectively, each of the angular members when in position having a side extending out at right angles to its associated bar and having a side extending at an acute angle thereto, means adapted to extend through different ones of said spaced holes for attaching said members to said bars, thereby permitting each of said members to be reversed in position with relation to top and bottom, and a cross-bar attached at the apices of said sides for supporting the forward end of a plank.

3. A runway support for wheelbarrows comprising a supporting member hooked at its upper end for attachment to forms for concrete, said supporting member containing a plurality of longitudinally spaced holes, two spaced angular-shaped members each of which when in position has a side extending out at right angles to said supporting member and another side extending at an acute angle thereto, means adapted to extend through different ones of said spaced holes for attaching said angular members to said supporting member, thereby permitting each of said angular members to be reversed in position with relation to top and bottom, and a crossbar attached at the apices of said sides for supporting the forward end of a plank.

SEVERIN G. KLEVEN.